United States Patent
Hughes et al.

(10) Patent No.: US 10,683,944 B1
(45) Date of Patent: Jun. 16, 2020

(54) TIRE INFLATION PRESSURE CONTROL DEVICE

(71) Applicants: Eugene A. Hughes, San Francisco, CA (US); James L. Regens, Nichols Hills, OK (US)

(72) Inventors: Eugene A. Hughes, San Francisco, CA (US); James L. Regens, Nichols Hills, OK (US)

( * ) Notice: Subject to any disclaimer, the term of this patent is extended or adjusted under 35 U.S.C. 154(b) by 0 days.

(21) Appl. No.: 16/040,595

(22) Filed: Jul. 20, 2018

Related U.S. Application Data

(60) Provisional application No. 62/700,508, filed on Jul. 19, 2018.

(51) Int. Cl.
| | |
|---|---|
| *B60C 23/00* | (2006.01) |
| *B60S 3/04* | (2006.01) |
| *F16K 15/20* | (2006.01) |
| *B60S 5/04* | (2006.01) |

(52) U.S. Cl.
CPC .......... *F16K 15/207* (2013.01); *B60C 23/004* (2013.01); *B60S 5/043* (2013.01)

(58) Field of Classification Search
CPC ...... F16K 15/207; B60C 23/004; B60S 5/043; Y10T 137/5421
See application file for complete search history.

(56) References Cited

U.S. PATENT DOCUMENTS

| | | | | |
|---|---|---|---|---|
| 2,716,998 A * | 9/1955 | Knasko | .................... | B60S 5/043 137/231 |
| 2,869,573 A * | 1/1959 | Stafford | ................ | B60C 29/064 137/223 |
| 4,969,493 A * | 11/1990 | Lee | .......................... | B60S 5/043 137/227 |
| 5,307,846 A * | 5/1994 | Heinemann | ............. | B60S 5/043 137/223 |
| 5,780,734 A * | 7/1998 | Johnson | ................... | G01L 17/00 73/146.3 |
| 5,855,222 A * | 1/1999 | Jou | .......................... | B05B 1/005 137/223 |
| 5,857,481 A * | 1/1999 | Zimmerman | ........... | B60S 5/043 137/227 |
| 2002/0084282 A1 * | 7/2002 | Wu | .......................... | B60S 5/043 222/5 |

\* cited by examiner

*Primary Examiner* — Mary E McManmon
*Assistant Examiner* — Kevin R Barss
(74) *Attorney, Agent, or Firm* — Gable Gotwals

(57) ABSTRACT

A tire inflation pressure control device of this disclosure may be a handheld device temporarily connected to a valve stem of a tire and used to check, add, or reduce pressure as needed. One or more ports of the device may share these functions. In other embodiments, the device may be attached to a rim of the tire and include a toroidal-shaped pressure chamber. Pressure may be increased using an installed pressurizer or one that is temporarily connected when needed. In some embodiments, the pressurizer is a $CO_2$, nitrogen, or nitrogen/argon gas cartridge. Likewise, a pressure gauge may be installed or temporally connected when needed, and used at the same time as the pressurizer.

7 Claims, 3 Drawing Sheets

TIRE INFLATION PRESSURE CONTROL DEVICE

CROSS-REFERENCE TO PENDING APPLICATION

The present application claims priority to U.S. Provisional Application No. 62/700,508, filed Jul. 19, 2018, which is incorporated herein by reference.

BACKGROUND

This disclosure is in the field of devices used to monitor and inflate a vehicle tire.

Tire pressure must be within a designated range to ensure safety and minimize premature tire wear. When pressure is below this range, air may be added using an air hose connected to a compressed air source. Manual devices to monitor the pressure include a piston-plunger-type pressure gauge or a dial-type (bourdon tube) gauge. When using these devices to check tire pressure, multiple readings may be required to determine or estimate the actual pressure. Automatic devices, such as those installed in motorized vehicles, may alert an operator when low pressure conditions are detected but do not alleviate the iterative process for manually adjusting and checking the pressure.

SUMMARY

Embodiments of a tire inflation pressure control device of this disclosure include a housing containing a pressure chamber and a plurality of ports arranged about the housing in pneumatic communication with the pressure chamber. One port may be connectable to a valve stem of a tire. Another port may be connectable to an external pressurized source of fluid. Yet another port may provide means for pressure release. In some embodiments, the device may be handheld. In other embodiments, the device is installed on a vehicle or tire. Pressurized fluid is released into the tire when the pressure falls below a predetermined minimum pressure.

NUMBERING AND ELEMENTS USED IN THE DRAWING

Figure 1:
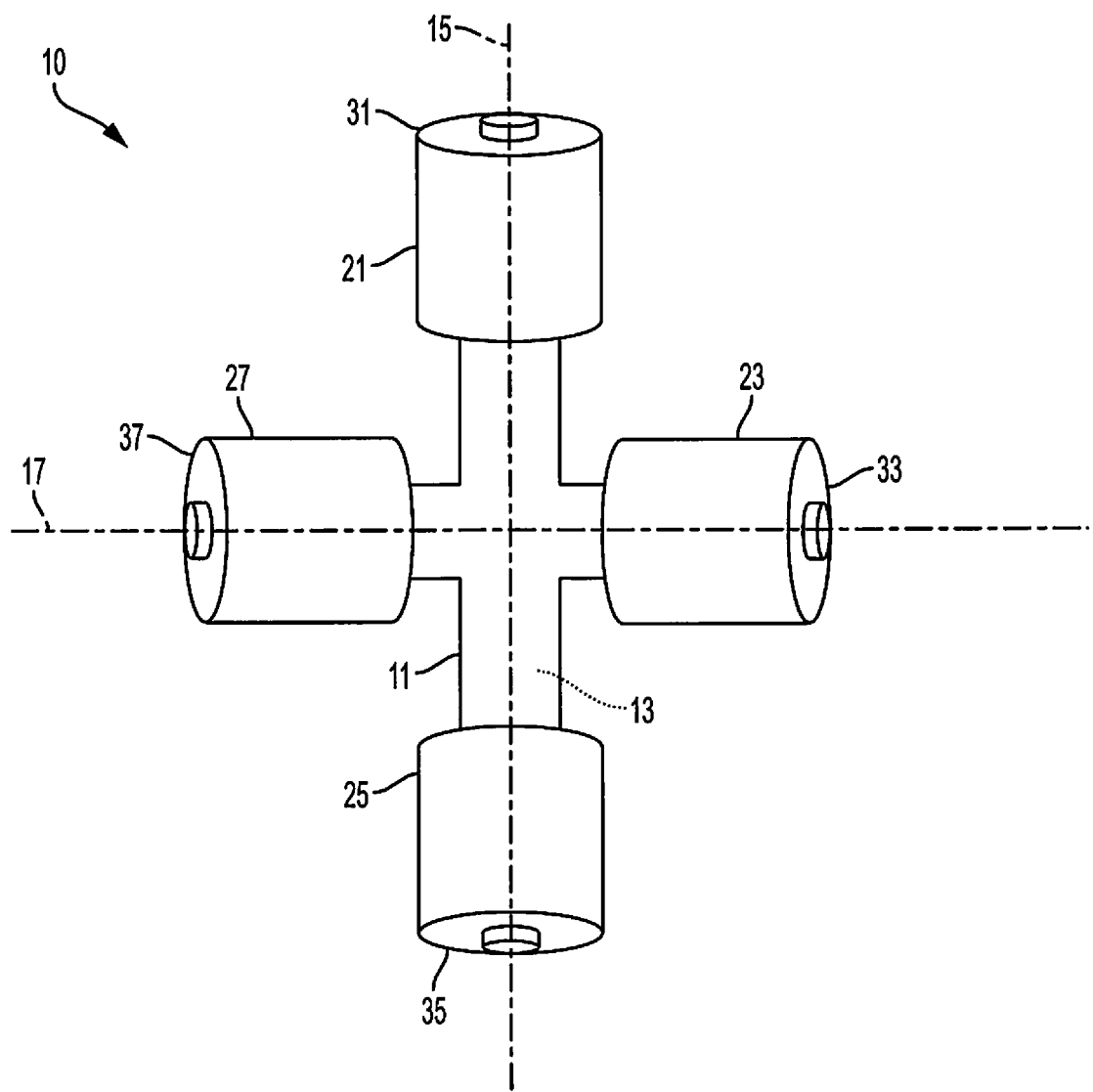
FIG. 1 is an isometric view of an embodiment of a tire inflation pressure control device of this disclosure.
Figure 2:
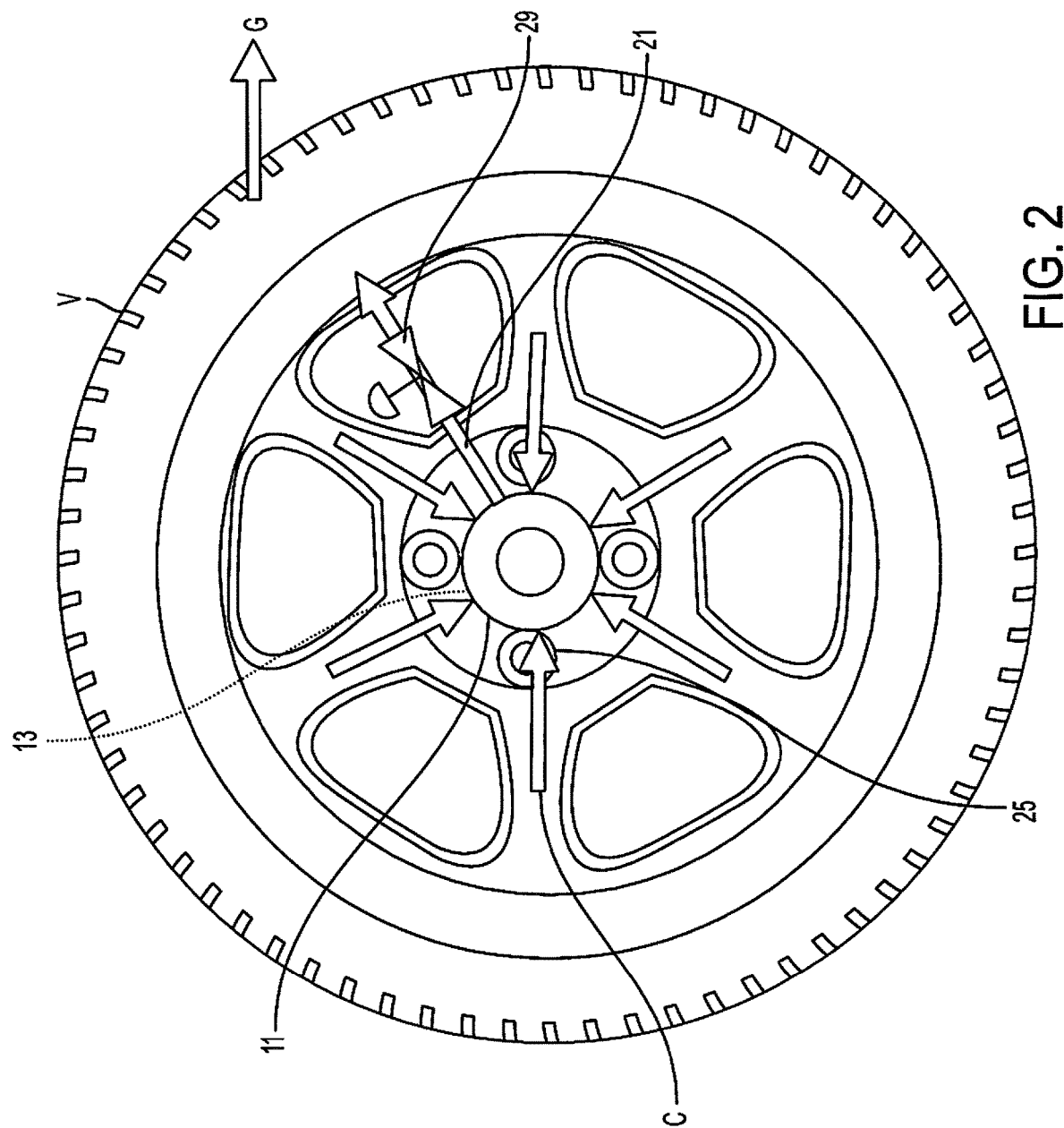
FIG. 2 is a view of another embodiment of the tire inflation pressure control device mounted to a backside of a tire rim.
Figure 3:
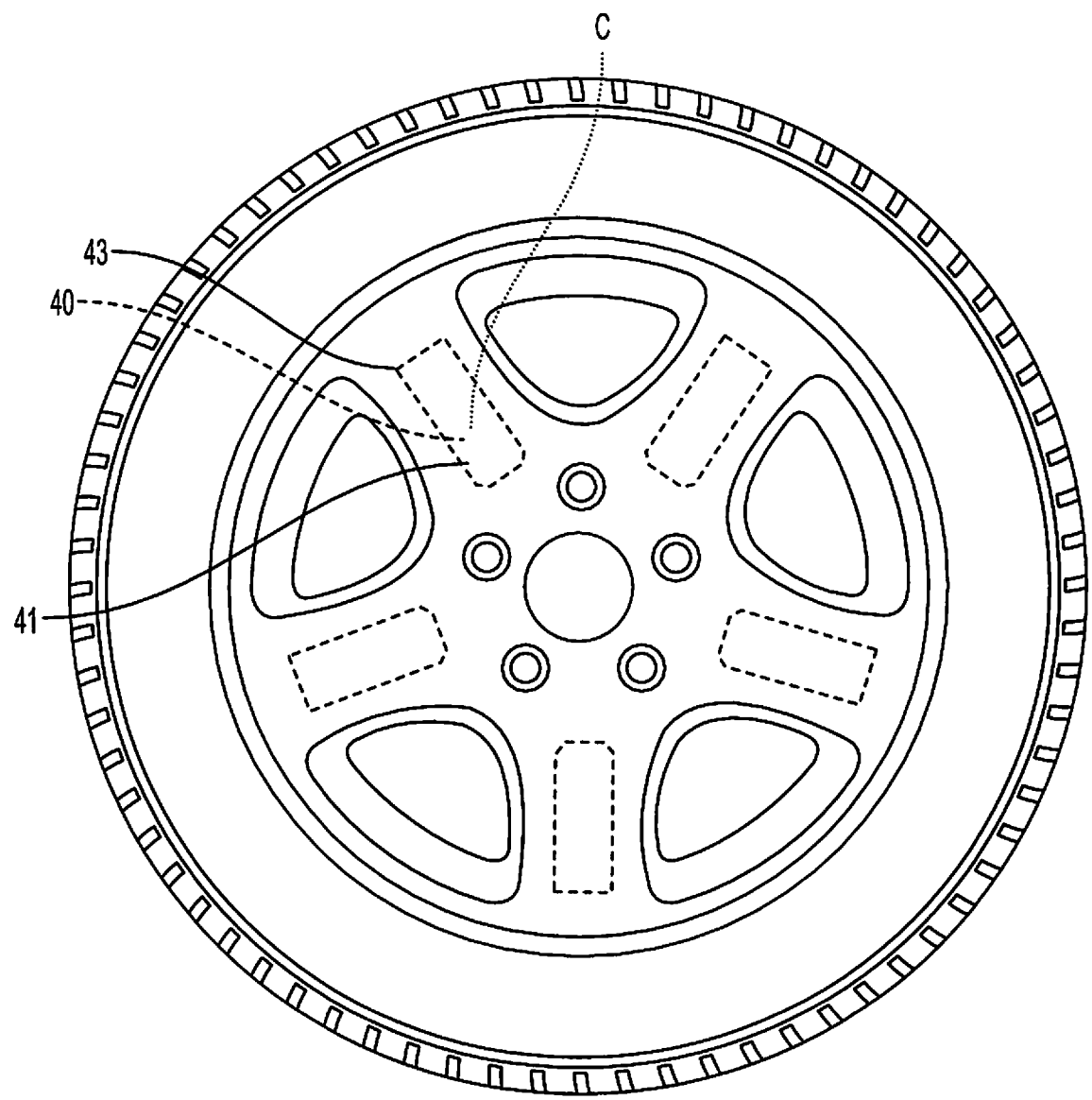
FIG. 3 is a front elevation view of an embodiment of a tire rim equipped with compartments that contain a gas cartridge or cylinder.

10 Tire inflation pressure control device
11 Housing
13 Pressure chamber
15 First centerline
17 Second centerline
21 First port
23 Second port
25 Third port
27 Fourth port
29 Pressure control module
31 First connection (may be installed permanently as in a pressure gauge as part of 10)
33 Second connection
35 Third connection
37 Fourth connection
40 Compartment
41 Door
43 Hinge
C Cylinder
V Tire pressure volume
G Tire pressure gauge or display.

DETAILED DESCRIPTION

In embodiments of this disclosure, a tire inflation pressure control device may be temporarily connected to a valve stem of a tire and used to check, add, or reduce pressure as needed. One or more ports of the device may share these functions. In other embodiments, the device may be attached to a rim of the tire and include a toroidal-shaped pressure chamber. Pressure may be increased using an installed pressurizer or one that is temporarily connected when needed. In some embodiments, the pressurizer is a $CO_2$, nitrogen, or nitrogen/argon gas cartridge or equivalent using any gas or even liquid that becomes gas when pressure is lowered. Likewise, a pressure gauge may be installed or temporally connected when needed, and used at the same time as the pressurizer. Each function—connecting to the tire and checking, adding, and reducing pressure—may also be built into the device.

Referring now to the drawings, a tire inflation pressure control device 10 includes a housing 11 containing a pressure chamber 13 in pneumatic communication with a plurality of ports 21, 23, 25, 27. In some embodiments, port 21 may include a connection 31 to a valve of a tire. The connection 31, like other connections described below, may be a permanent connection or a threaded or snap connection. Similarly, one or more the connections may be part of a pressure gauge G. Port 23 may include a 33 to a pressure gauge such as a piston-plunger-type pressure gauge or a dial-type (bourdon tube) gauge. The pressure gauge may also be a built-in or permanent pressure gauge. Port 25 may include a connection 35 to a pressurized source of fluid such as, but not limited to, a $CO_2$, nitrogen, or nitrogen/argon gas cartridge or cylinder. The port 25 may also be capable of connection to an air hose in pneumatic communication with a compressed source of air. In some embodiments, port 25 may be connectable to a manifold including one, two or more gas cartridges. Port 27 may include a pressure release attachment or device, and may include a connection 37.

In embodiments, two of the ports 21, 23, 25, 27 may share a common centerline 15 of the housing 11 with another two of the ports 21, 23, 25, 27 sharing another centerline 17 of the housing 11. In some embodiments, the centerlines 15, 17 are arranged perpendicular to one another. In other embodiments, the housing 11 includes fewer ports, with at least one port configured to perform two of the functions described above. The housing 11 may be Y-shaped with at least one of the ports 21, 23, 25, 27 shared. In other embodiments, the ports 21, 23, 25, 27 not sharing centerlines or having centerlines 15, 17 that intersect one another.

In other embodiments, the tire inflation pressure control device 10 may include a ring- or toroidal-shaped housing 11 containing a pressure chamber 13 and installed on the tire rim with at least one port 21, 23, 25, 27 in pneumatic communication with a volume of air of the tire and another of the ports 21, 23, 25, 27 in pneumatic communication with one or more gas cartridges or cylinders. The pressure chamber 13 contains one or more gas cylinders at high pressure and ready to be activated manually (or automatically) to control pressure.

Tire pressure may be determined using the motorized vehicle's installed tire pressure gauge G with pressure addition or reduction being performed manually or automatically activated when the tire pressure gauge senses pressure at a predetermined value. Pressure should be controlled because open-ended inflation could cause tire wear and even exceed the desired (maximum) pressure and exhaust the cartridges or cylinders. In manual mode, the pressure may be monitored and stopped at the desired inflation by controlling a valve connecting the cylinder to the housing 11. In some embodiments, the pressure is displayed so the operator can manually and remotely open the valve to inflate and close when pressure is correct. In automatic mode, a valve or pressure control module 29 can be configured to open the cylinder pressure to tire pressure volume V at a set pressure and close at a predetermined higher pressure. In some embodiments, means of a kind known in the art may be configured to provide an alert indicating one or more of the cylinders C require replacement.

By way of a non-limiting example, a rear portion of a tire rim may be fitted with a toroidal-shaped housing 11, with one or more spokes of the tire rim including a compartment 40 into which a gas cartridge or cylinder C may be inserted. The spoke may include a door 41 that conceals the cylinder C. The door 41, which may have a same exterior finish as the spoke, can include a hinge 43 located toward the tire side of the door 41. When closing and fully closed, the door 41 presses the cylinder C into pneumatic communication with the housing 11. This places the pressure chamber 13 of the housing 11 at the same high pressure as the cylinder C, with the chamber 13 connecting all installed cylinders C together in one pressure volume. The pressure chamber 13 is in pneumatic communication with a valve or pressure control module 29 of the tire. In embodiments, the valve or pressure control module 29 may include a check valve or pressure stop connection so that when one or more cylinders C are removed, the tire does not deflate.

While embodiments of tire inflation pressure control device and a method of its use have been described, modifications can be made to the details of construction without departing from the scope of this disclosure. The following claims and their recited elements and limitations include the full range of equivalents to which they are entitled.

The invention claimed is:

1. A tire inflation pressure control device comprising:
a tire rim;
a toroidal-shaped housing contained by the tire rim and arranged coaxial to the tire rim, the toroidal-shaped housing forming a circular-shaped pressure chamber;
a plurality of ports arranged about the toroidal housing, each port of the plurality in pneumatic communication with the circular-shaped pressure chamber; and
a canister contained by the tire rim, the canister including a pressurized source of fluid;
a first port of the plurality connected to a valve stem of a tire;
a second port of the plurality connected to the canister; and
a third port of the plurality providing a means for pressure release.

2. A tire inflation pressure control device according to claim 1, further comprising a pressure gauge configured to provide a pressure reading of the circular-shaped pressure chamber.

3. A tire inflation pressure control device according to claim 2, wherein the second port includes a valve configured to open when the pressure reading is at a predetermined first pressure limit and close when the pressure reading is at a predetermined second higher pressure limit.

4. A tire inflation pressure control device according to claim 1, further comprising a fourth port of the plurality connectable to a pressure gauge.

5. A tire inflation pressure control device according to claim 1, the pressurized source of fluid including $CO_2$.

6. A tire inflation pressure control device according to claim 1, the canister including a threaded end.

7. A tire inflation pressure control device according to claim 1, wherein at least one port of the plurality is arranged opposite another port of the plurality.

* * * * *